United States Patent [19]

Johansson

[11] Patent Number: 4,788,527

[45] Date of Patent: Nov. 29, 1988

[54] APPARATUS AND METHOD FOR DEVICE CONTROL USING A TWO CONDUCTOR POWER LINE

[76] Inventor: Fritz H. Johansson, 2512 S. Playa, Mesa, Ariz. 85202

[21] Appl. No.: 651,440

[22] Filed: Sep. 17, 1984

[51] Int. Cl.[4] ........................ G08B 1/08; H04Q 7/00

[52] U.S. Cl. ........................ 340/310 A; 340/505; 340/531; 340/534; 340/538

[58] Field of Search .......... 340/310 A, 310 R, 870.02, 340/538, 505, 531, 534, 825.06, 825.1, 825.07, 825.54

[56] References Cited

U.S. PATENT DOCUMENTS

| | | | |
|---|---|---|---|
| 2,861,257 | 9/1953 | Weintraub | 340/163 |
| 2,866,963 | 12/1958 | Coley et al. | 340/150 |
| 3,021,520 | 2/1962 | Weber | 340/384 |
| 3,025,496 | 3/1962 | Schmid | 340/164 |
| 3,411,058 | 11/1968 | Madsen et al. | 318/138 |
| 3,453,510 | 7/1969 | Kreuter et al. | 318/18 |
| 3,462,756 | 8/1969 | Mills | 340/310 |
| 3,581,183 | 5/1971 | Piazza | 318/696 |
| 3,697,975 | 9/1972 | Bernstein | 340/310 |
| 3,766,462 | 10/1973 | Kubo | 318/696 |
| 3,896,363 | 7/1975 | Kinsel et al. | 318/685 |
| 4,074,179 | 2/1978 | Kuo et al. | 318/696 |
| 4,293,846 | 10/1981 | Allison | 340/310 A |
| 4,312,059 | 1/1982 | Mandai et al. | 368/157 |
| 4,328,482 | 5/1982 | Belcher et al. | 340/310 A |
| 4,368,990 | 1/1983 | Ueda et al. | 368/157 |
| 4,376,910 | 3/1983 | Peslier | 340/310 A |
| 4,382,691 | 5/1983 | Shida et al. | 368/157 |
| 4,419,667 | 12/1983 | Gurr et al. | 340/310 A |
| 4,435,706 | 3/1984 | Callan | 340/310 A |
| 4,507,645 | 3/1985 | Kehl | 340/310 A |
| 4,573,041 | 2/1986 | Kitagawa et al. | 340/310 A |
| 4,633,217 | 12/1986 | Akano | 340/310 A |
| 4,689,605 | 8/1987 | Leue | 340/333 |

*Primary Examiner*—Douglas W. Olms
*Assistant Examiner*—Curtis Kuntz
*Attorney, Agent, or Firm*—Victor Flores

[57] ABSTRACT

In a system in which a power supply provides power to a plurality of remote devices and sensoring devices, apparatus for applying an initial control signal to the power source lines activates a clock/logic network associated with each group of remote sensoring devices and load devices. The initial control signal defines and synchronizes a plurality of time intervals following the initial control signal. A sensor associated with a clock-/logic apparatus can apply a signal to the power line during a time interval that can be interpreted by the control apparatus as an indication of a state of the associated sensor. Similarly, the clock/logic apparatus can enable a load element during a pre-established time interval following the initial control signal, however, the load element can be activated only if the control apparatus applies a signal to the power lines during the pre-established period. The system thus utilized the power conductors to communicate control information and sensor data between a control apparatus and remote devices.

5 Claims, 2 Drawing Sheets

APPARATUS AND METHOD FOR DEVICE CONTROL USING A TWO CONDUCTOR POWER LINE

BACKGROUND OF THE INVENTION

1. Field of the Invention

This invention relates generally to control apparatus and more particularly to apparatus for controlling a plurality of devices coupled to a two conductor power line.

2. Discussion of the Related Art

It is known in the related art to control electrical devices with a plurality of control lines that are coupled to the devices in addition to the power lines. The control lines transmit information to the electrical devices relating to activation and interruption of activity and return sensor information from the devices being controlled. However, the use of a multiplicity of control lines can be increasingly complicated for any but a minimum number of devices, and each control line increases the possibility that a malfunction will occur during the interconnection of the control lines to the respective devices. It is also known in the related art to provide a carrier signal that can be applied to the power line. Modulation can be superimposed on the carrier signal, and when demodulation apparatus is available in the vicinity of the electrical devices, control information can be transfered via the carrier frequency.

A need has therefore been felt for control apparatus that would minimize or completely eliminate the use of independent control lines or imposed carrier signals and would transfer information between the power source and the operating device by means of the power lines with a minimum of additional apparatus.

SUMMARY

It is therefore an object of the present invention to provide an improved control system for the control of electrical apparatus.

It is another object of the present invention to control a plurality of remote devices using only the lines available to transmit the power for energizing the devices.

It is a more particular object of the present invention to provide apparatus close to the source of the power for applying a transient signal to the power line.

It is yet another particular object of the present invention to provide a control system in which a pulse introduced at the power source activates clock/logic circuits near the device, the clock/logic circuits introducing a response signal to the power line in the event of the presence of the certain condition at a device.

It is still another particular object of the present invention to provide a control system wherein a signal is applied to the power line and activates a clock/logic circuit, the clock/logic circuit enabling selected devices with a logic pulse, a second pulse activating the selected device.

It is still another particular object of the present invention to activate a clock/logic circuit in the vicinity of remote devices that are to be controlled, the activation causing a series of time intervals to be generated and a response signal applied to the power line during a pre-selected time interval conveying decoded information to the control circuit.

The aforementioned and other objects are accomplished, according to the present invention, by a control circuit in the vicinity of the power supply. The control apparatus is coupled to a signal device which in turn is coupled to the power lines that can cause a control signal. The control signal is propagated on the power lines to a clock/logic circuit located in the vicinity of the remote device receiving power from the power supply. The control signal from the signal device causes the clock/logic circuit to begin defining a sequence of time intervals with respect to the control signal. Each interval of time has a pre-defined meaning with respect to activity of the operation when the system device is to transfer to the control apparatus the existence of a given condition, a combination of a pre-defined check interval and an appropriate logic signal applied by the clock/logic circuit to the powerline. The relationship of the occurrence in time of the clock/logic signal, when compared to the original control signal, conveys information to the control apparatus that can be utilized for further control decisions. A memory means containing a control program is utilized in this comparison. If on the other hand activation of a particular device is desired, then the pre-defined time interval produces an output signal in a clock/logic circuit that enables the selected device. The application of a second signal by the control apparatus to the power line during the predetermined time interval activates or (deactivates) the selected device. For example, the activation (or deactivation) could relate to application of current of the coils of the stepping motor.

The power supply can be coupled to a plurality of groups of remote devices by a plurality of two conductor power leads. The control signal synchronizes the clock/logic circuit associated with each remote group of devices. In this way a series of motors can be operated synchronously. The condition is imposed in this procedure that two pulses cannot be generated by any of the clock/logic circuits during the same time interval. A generation of two signals during the same time interval can provide conflicting signals to the system.

These and other features of the invention will be understood upon reading of the specification along with the figures.

DESCRIPTION OF THE PREFERRED EMBODIMENT

Detailed Description of the Drawings

Figure 1:
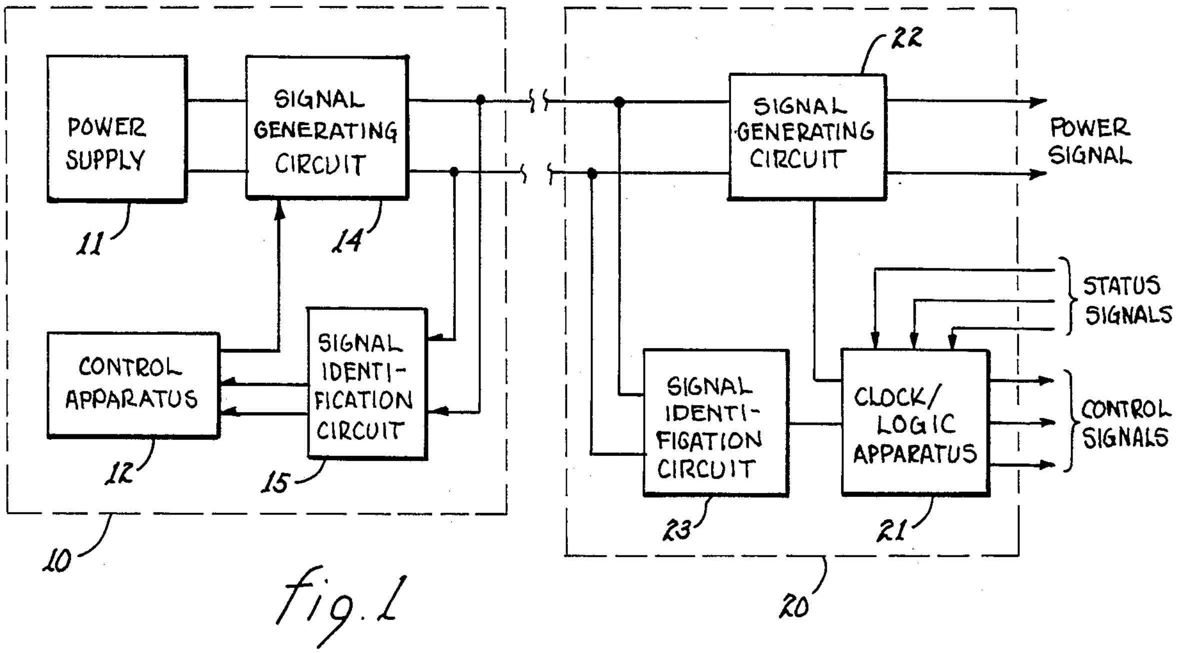
FIG. 1 is a schematic block diagram of the apparatus of the instant invention.

Referring now to FIG. 1, system portion 10 includes apparatus located in the vicinity of the power supply. Power supply 11 has two power lines, 4 and 5, associated therewith. Signal identification apparatus 15 is coupled to the power line for the receipt of signals and to control apparatus 12. Control apparatus 12 is coupled to signal generating apparatus 14 for applying a signal to the power line.

System portion 20 represents the group of remote devices and sensors being manipulated by a program in control apparatus 12. Signal identification circuit 23 is coupled to the power lines 4 and5 and can detect control signal applied thereto. The clock/logic circuit 21 is coupled to the signal identification circuit 23 and to signal generating circuit 22. Signal generating circuit 22 is coupled to power lines 4 and 5. The clock/logic circuit 21 receives status signals from associated sensors and applies control signals to associated devices.

Figure 2:
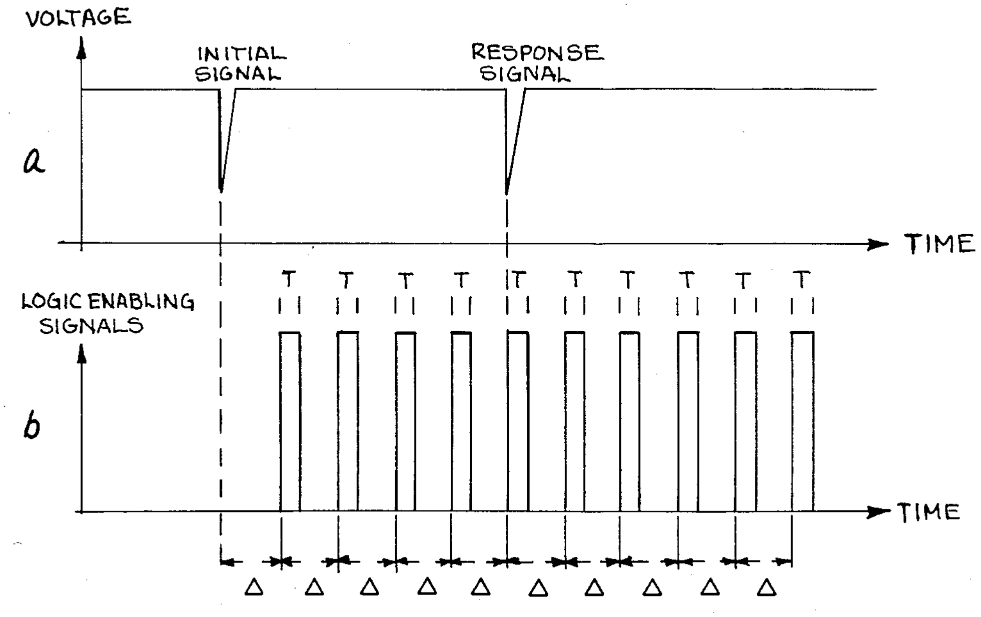
FIG. 2 is a simplified timing diagram illustrating the informational aspects of the instant invention.

Referring next to FIG. 2, FIG. 2*a* is a representation of an initial signal pulse of current on the power lines 4 and 5 and a response signal applied to power lines 4 and 5 after a preestablished time. Referring next to FIG. 2*b*, the series of time intervals of duration T, occuring after the initial signal are generated by the clock mechanism in the clock/logic circuit 21 is shown. Time intervals 1 through 5 can, for example, be associated with input signals from the sensors, while time intervals 6 through 10 can be associated with the activation of associated devices. For example, if during the 7th time interval, a motor is to be activated, an output signal from clock/logic circuit 21 would be generated during that interval so that activation can be accomplished. A control signal applied to the power lines by the signal generating apparatus 14 actually results in the activation of the electrical device. However, the enabling signal from the clock/logic circuit and the control signal must occur during the same time interval.

Figure 3:
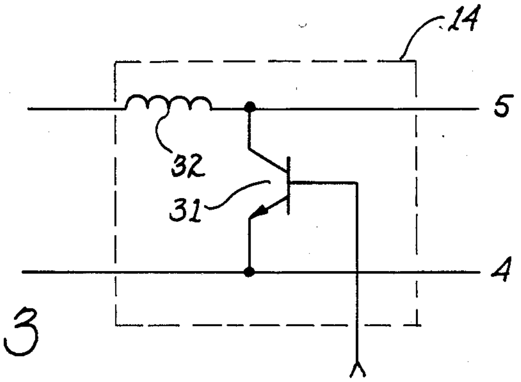
FIG. 3 is a schematic circuit diagram of signal generating circuit according to the preferred embodiment of the present invention.

Referring next to FIG. 3, the signal generating circuit 14, according to the preferred embodiment is shown. One terminal of inductor 32 is coupled to the power supply side of line 5. A second terminal of inductor 32 is coupled to electrical device side of power line 5 and to a collector of transistor 31. The base of transistor 31 is coupled to control circuit 12, while the emitter of transistor 32 is coupled to the power supply line 4.

Figure 4:
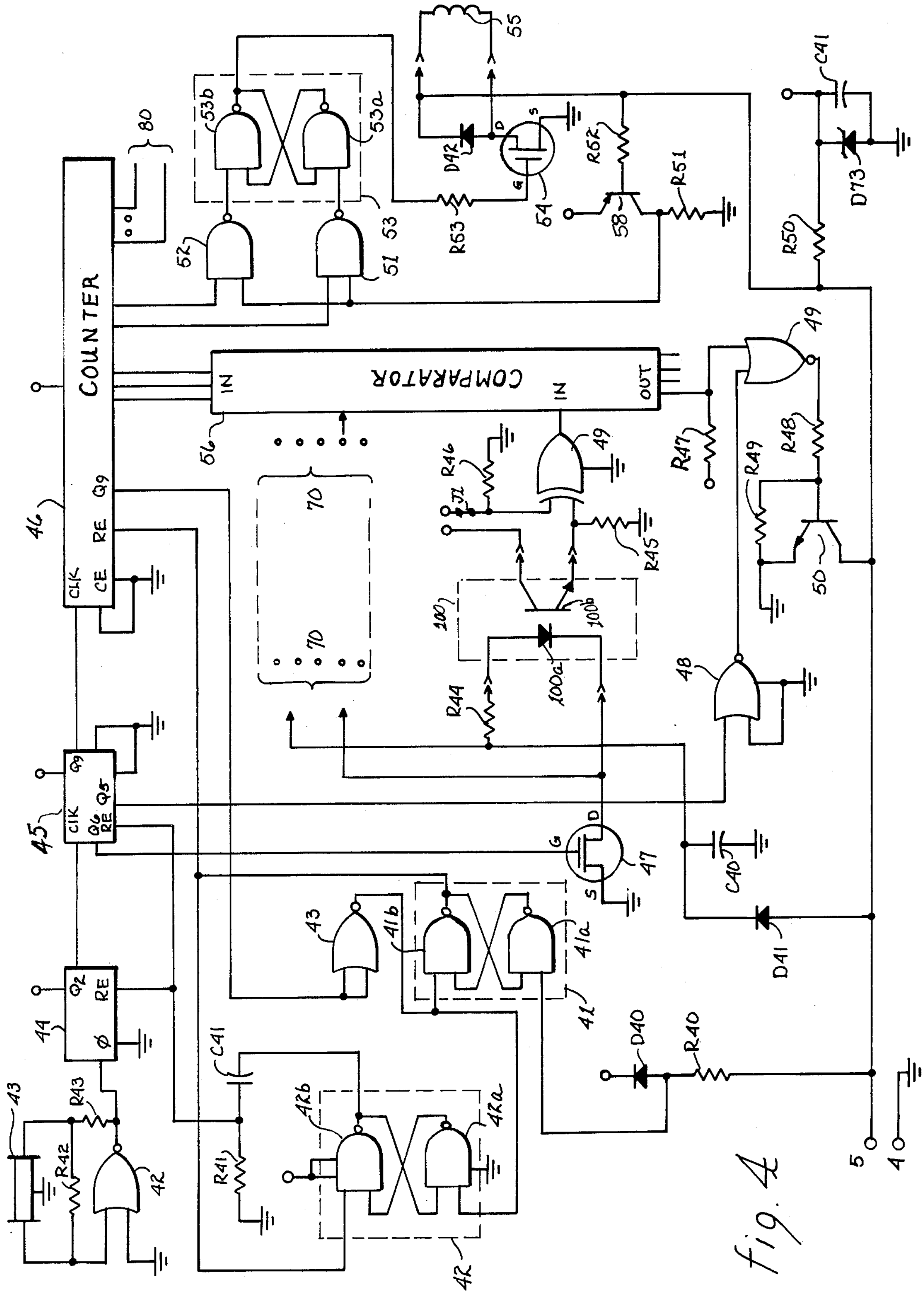
FIG. 4 is a schematic circuit diagram of the clock/logic circuit and related electrical devices for a practical application.

Referring now to FIG. 4, power supply line 4 is coupled to ground potential, while power supply line 5 is coupled to one terminal of resistor $R_{40}$, to an anode of diode $D_{41}$, to a collector of NPN transistor 50, to one terminal of resistor $R_{50}$, to one terminal of resistor 52, to a cathode terminal of diode $D_{42}$, and to a first terminal of load 55. A second terminal of resistor $R_{50}$ is coupled through to a cathode of diode $D_{73}$ and zener diode $D_{73}$ to ground potential, through capacitor $C_{41}$ to ground potential, and to a local power supply terminal. A second terminal of resistor $R_{40}$ is coupled to an anode of diode $D_{40}$ and to an input terminal of logic circuit 41. The cathode of diode $D_{41}$ is coupled to the local power supply terminal. Logic circuit 41 is comprised of a pair of cross-coupled logic AND gates 41*a* and 41*b*. The input terminal of logic circuit 41 is coupled to a first input terminal of logic AND gate 41*a*. The output terminal of logic AND gate 41*a* is coupled to an input terminal of logic AND gate 41*b*. The output terminal of logic AND gate 41*b* is coupled to a second input terminal of logic AND gate 41*a*, to a RE terminal of counter 46 and to an input terminal of logic circuit 42. Logic circuit 42 is comprised of a pair of cross-coupled logic AND gates 42*a* and 42*b*. The input terminal of logic circuit 42 is coupled to a first input terminal of logic AND gate 42*b*. The output terminal of logic AND gate 42*b* is coupled to a first input terminal of logic AND gate 42*a* and through capacitor $C_{41}$ to one terminal of resistor $R_{41}$, to a RE terminal of counter 44 and to a RE terminal of counter 45. A second input terminal of logic AND gate 42*a* is coupled to a second input terminal of logic AND gate 41*b* and to an output terminal of inverter 43. The input terminal of inverter 43 is coupled to a (final) data terminal of counter 46. A second terminal of resistor 41 is coupled to ground potential.

Crystal oscillator 43 has a first terminal coupled to one terminal of resistor $R_{42}$ and to a first input terminal of logic NOR gate 42. A second input terminal logic NOR gate 42 is coupled to ground potential. A second terminal of oscillator 43 is coupled to a second terminal of resistor $R_{42}$ and to a first terminal of resistor $R_{43}$. A second terminal of resistor $R_{43}$ is coupled to an output terminal of logic NOR gate 42 and to an input terminal of counter 44. The $Q_2$ terminal of counter 44 is coupled to the clock terminal of counter 45. An output terminal of counter 45 is coupled to the clock terminal of counter 46. The $Q_6$ terminal of counter 45 is coupled to a gate terminal of transistor 47. A source terminal of transistor 47 is coupled to the ground potential and a drain terminal of transistor 47 is coupled to a plurality of light emitting diode cathodes, of which diode 100*a* is illustrated. The anodes of the diodes, of which 100*a* is an example, are coupled through resistors, of which resistor $R_{44}$ is associated with the anode of diode 100*a*, to a first terminal of capacitor $C_{40}$ and to a cathode terminal of diode $D_{41}$. The second terminal of capacitor $C_{40}$ is coupled to the ground potential.

In element 100, illustrating one of a plurality of sensor elements, the diode 100*a* is a light emitting diode and photodiode element 100*b* is a light-detection. One terminal of the photodiode 100*b* is coupled to the local power supply terminal, while a second terminal of the photodiode is coupled through resistor $R_{45}$ to the ground potential and to one input of exclusive OR gate 49. A second input terminal of exclusive OR gate 49 is coupled through jumper $J_1$ to the local power supply terminal and through resistor $R_{46}$ to ground potential. An output terminal of exclusive OR gate 49 is coupled to an input terminal of logic comparator 56. A plurality of other sensing elements similar to element 100 and to exclusive OR gate 49 can be included in the system as shown by region 70. Each of these sensors will have a signal that is coupled to comparator 56. Comparator 56 will in general be coupled to a plurality of output terminals of counter 46. One output terminal of comparator 56 can be associated with sensor 100 and is coupled through resistor $R_{47}$ to a local power supply terminal and to a first input terminal of logic NOR gate 49. A second input terminal of logic NOR gate 49 is coupled to an output terminal of logic NOR gate 48. An output terminal of logic NOR gate 49 is coupled through resistor $R_{48}$ to a gate terminal of NPN transistor 50 and one terminal of resistor $R_{45}$. An emitter terminal of transistor 50 is coupled to a second terminal of resistor $R_{45}$ and to the ground potential. A first input terminal of logic NOR gate 48 is coupled to the ground potential, while a second input terminal of logic NOR gate 48 is coupled to the $Q_8$ data output terminal of counter 45.

A second terminal of resistor $R_{52}$ is coupled to a base terminal of PNP transistor 58, while an emitter element of PNP transistor 58 is coupled to the local power supply terminal. The collector terminal of PNP transistor 58 is coupled through resistor $R_{51}$ to the ground potential, to a first input terminal of logic NAND gate 51 and to a first input terminal of logic NAND gate 52. An output terminal of counter 46 is coupled to a second input terminal of NAND gate 51, while another output terminal of counter 46 is coupled to a second input terminal of logic NAND gate 52. The output terminals of logic NAND gate 51 and logic NAND gate 52 are coupled to input terminals of logic circuit 53. Logic circuit 53 is comprised of cross-coupled logic AND gates 53*a* and 53*b*. The output terminal of logic NAND gate 51 is coupled to a first input terminal of logic NAND gate 53*a*, while an output terminal of logic NAND gate 52 is coupled to an input terminal of logic NAND gate 53*b*. An output terminal of logic NAND gate 53*a* is coupled to a second input terminal of logic NAND gate 53*b*, while an output terminal of logic NAND gate 53*b* is coupled to a second input terminal of logic NAND gate 53A and through resistor $R_{53}$ to a gate electrode of transistor 54. The drain electrode of transistor 54 is coupled to ground potential while a source electrode of transistor 54 is coupled to a anode of diode $D_{42}$ and to a second terminal of load element 55. The designation 80 shows that these circuits can be duplicated to provide control for a plurality of load elements.

Operation of the Preferred Embodiment

The operation of the instant invention can best be understood in the following manner. The program in the control apparatus initiates an initial control signal that is applied to the power lines that resets the operation of the clock/logic circuit of each remote device and begins defining a number of time intervals. Associated with each time interval is either the decoding of a logic signal associated with a sensor or the generation of a device enable signal. From the sensor decoding information, a response signal provides information to the control apparatus with respect of the condition of a sensors. Alternatively, during a predetermined time interval the clock/logic circuit can enable a device in response to a control signal from the control apparatus 12. The combination of clock/logic (enabling) signal and the control apparatus (activation) signal results in activation of a device associate with the predetermined time interval.

It will be clear that an arbitrary number of time intervals can be generated by a clock/logic circuit. It will also be clear that it is important to correlate the generation of the appropriate time intervals by a clock/logic circuit with the program stored in a memory device of the control apparatus so that the control apparatus does not misinterpret transient signals identified on the power lines 4 and 5 or does not apply (activation) signals to the power lines at inappropriate time.

The power supply lines 4 and 5 can be coupled to a multiplicity of output devices. The initial control signal will cause an appropriate time interval generation in a clock/logic circuit 21 and control signals and sensor signals can be identified. By ensuring that the same time interval in each of the clock/logic circuit cannot be misinterpreted by the control apparatus, a multiplicity of devices can be synchronized. With respect to the identification and interpretation of sensor signals applied to the power lines, conflicting or ambiguous signals cannot be received by the control apparatus 12 without compromising the integrity of the information transfer.

Referring again to FIG. 4, the application of the basic invention shown in FIG. 1 is illustrated for a moderately complex control system. The bulk of the circuitry shown is analogous to the clock/logic circuit located in the vicinity of the remote devices. Element 100 is illustrative of the remote sensor in the case of an optical sensor while element 55 is illustrative of a typical load element such as a relay or motor coil. Elements 44, 45, and 46 are clock elements, that provide a means for identifying predetermined periods. The basic driving circuit is the crystal oscillator 43 and associated components. A pulse on the power lines 4 and 5 is identified through resistor $R_{40}$ and activates bistable logic circuit 41. This logic circuit 41 resets counter 44 and 46 and through bistable circuit 42, resets counters 44 and 45. The output terminals of counter 46 are applied to comparator 56 and provide an enabling signal during a predetermined time period. When a signal is applied by sensor 100 during the predetermined time period, a pulse signal is transmitted to transistor 50. Transistor 50 applies a pulse to the power lines 5 and 4. This pulse, together with the predetermined time period following the initial signal, indicates to the control apparatus 12 that a particular state of sensor 100 is present.

The circuit illustrated by FIG. 4 has an additional complexity in that the light emitting diode 100*a* of element 100 and the associated elements would draw an excessive of current, transistor 47, therefore provides a periodic pulsing of the current through the diode 100*a* and a lower power requirement is the result because of the low duty cycle. The operation of the sensor element 100 is not impaired by this reduced duty circuit.

Also illustrated by FIG. 4 is the application of current through a load element 55. When the counter 46 is being driven by oscillator 43 and associated components, logic OR gate 51 is enabled during a predetermined period of time determined by the number of counts necessary to activate that terminal. When a pulse is applied to power lines 5 and 4, providing a signal to the second terminal of NOR gate 51 and causing logic circuit 53 to be set, transistor 58 becomes nonconductive and current is halted to load 55, which can be a motor coil or solenoid, causing cessation of operation. To reactivate load 55, a counter signal and a power line signal must be applied to the terminals of NOR gate 52. With the simultaneous application of signal to gate 52, bistable logic circuit is reset causing transistor 54 to become conductive. In the counter configuration, separate (and possibly contiguous) time intervals can be used to define rotation direction in stepper motor application.

In typical operations, the interval T can be 5 us microseconds and the frequency of the time intervals can be 1000 hz. Because of the relatively short duty cycle of signal generating transistors 50 and 31, no special requirements other than the presence of inductor 32 are required. For electromechanical applications, the frequencies and time intervals can be relatively slow and still provide a superior control system.

Viewing the invention in another manner, control apparatus 12 and clock/logic circuit 21 provide a plurality of periods that are synchronized by the initial signal (i.e. of FIG. 2). Once this synchronization is accomplished, then permitted activity can be defined for each interval. For example, when a signal is transmitted by clock/logic circuit 21 during a predetermined interval, following the initial signal, control apparatus 12 can only interpret a signal in that period as defining a state of a sensor. Similarly, the clock/logic circuit 21 will always enable a load device during the same pre-established period following the initial signal. However, the device will be activated only by the presence of a signal (i.e. from the control apparatus) during that period. In this manner, control information and sensor data can be transferred along the power line at a speed more than adequate for a multiplicity of applications, such as control of a robot arm. The control apparatus can use the sensor data to make decision with respect to activation or deactivation of remote motors, solenoiods etc.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for transferring interrogation, control and response data on a DC power transmission line electrically coupling a controller apparatus and a plurality of remote devices having sensor and electro-mechanical devices, said apparatus comprising:

(a) a system interrogation/control means which comprises,
  (i) a control apparatus means for initializing and controlling generation of pulses on said DC power transmission line, said control apparatus having a program for synchronizing said initializing and controlling generation of pulses on said power transmission lines with said plurality of remote devices, said control apparatus comprising command means for generating a control command signal, timing/logic means for identifying at least one interval of predetermined duration after a pre-established delay,
  (ii) a control signal generation means for applying a single one of initialization and control pulses onto said DC power line in response to said control command signal, said control signal generation means being coupled to said DC power line and to said control apparatus means, and
  (iii) a response sensing means for receiving a response pulses from said DC power line, said response sensing means being coupled to said DC power line;
(b) a system response means which comprises:
  (i) a control sensing means for receiving and sensing said initialization and control pulses from said DC power line, said control sensing means being coupled to said DC power line,
  (ii) a clock/logic means for identifying at least one interval of predetermined duration after a pre-established delay, said clock/logic means being coupled to said response sensing means of said system receiving and response means, said delay commencing upon receiving an initial one of said command and control pulses from said DC power line,
  (iii) a response signal generation means for applying a single one of said response pulse onto said DC power line, said response signal generation means of said system response means being coupled to said DC power line and to said clock/logic means.

2. The apparatus of claim 1 wherein said initialization and control pulses and said response pulses comprise momentary deviations of a DC voltage on said DC power lines.

3. The apparatus of claim 1 wherein:

said control signal generation means comprises a semiconductor switching means controlled by a gating means, said semiconductor switching means being connected between a ground line and a voltage line, said gating means being connected to said control apparatus means, said response signal generation means comprises a semiconductor switching means controlled by a gating means, said semiconductor switching means being connected between said ground line and said voltage line, said gating means being connected to said clock/logic means.

4. The method of enabling remote devices having sensors and electro-mechanical devices coupled to common DC power lines comprising the steps of:

(a) coupling remote devices to common DC power transmission lines;
(b) synchronizing a plurality of time intervals in a system control means and one or more system response means, said system control means comprising:
  (i) a control apparatus means for initializing and controlling generation of pulses on said DC power transmission line, said control apparatus having a program for synchronizing said initializing and controlling generation of pulses on said power transmission lines with said plurality of remote devices, said control apparatus comprising command means for generating a control command signal, timing/logic means for identifying at least one interval of predetermined duration after a preestablished delay,
  (ii) a control signal generation means for applying a single one of initialization and control pulses onto said DC power line in response to said control command signal, said control signal generation means being coupled to said DC power line and to said control apparatus means, and
  (iii) a response sensing means for receiving a response pulses from said DC power line, said response sensing means being coupled to said DC power line, said system response means comprising:
  (i) a control sensing means for receiving and sensing said initialization and control pulses from said DC power line, said control sensing means being coupled to said DC power line,
  (ii) a clock/logic means for identifying at least one interval of predetermined duration after a pre-established delay, said clock/logic means being coupled to said response sensing means of said system receiving and response means, said delay commencing upon receiving an initial one of said command and control pulses from said DC power line,
  (iii) a response signal generation means for applying a single one of said response pulse onto said DC power line, said response signal generation means of said system response means being coupled to said DC power line and to said clock/logic means;
(c) associating one or more intervals with a specific one of said one or more system response means;
(d) activating a specific electro-mechanical device in said remote device connected to said one of said one or more system response means when said system control means applies a signal to said DC power lines during a first one of said one or more intervals associated with said specific remote device, and when said one of said one or more system response means applies a signal to said electro-mechanical device during said first one of said associated specified interval; and (e) signaling response information after said activating step during a second of said associated specified intervals, said signaling response including applying a response signal to said DC power lines by said one of said one or more system response means.

5. The method of enabling remote devices as recited in claim 4 further including the step of:

identifying response information by said response sensing means when said response signal generation means applies said response signal to said DC power line during said second associated specified interval.

* * * * *